E. A. JEFFREYS & W. B. SAYERS.
GEARING.
APPLICATION FILED MAR. 6, 1908.

919,359.

Patented Apr. 27, 1909.
7 SHEETS—SHEET 1.

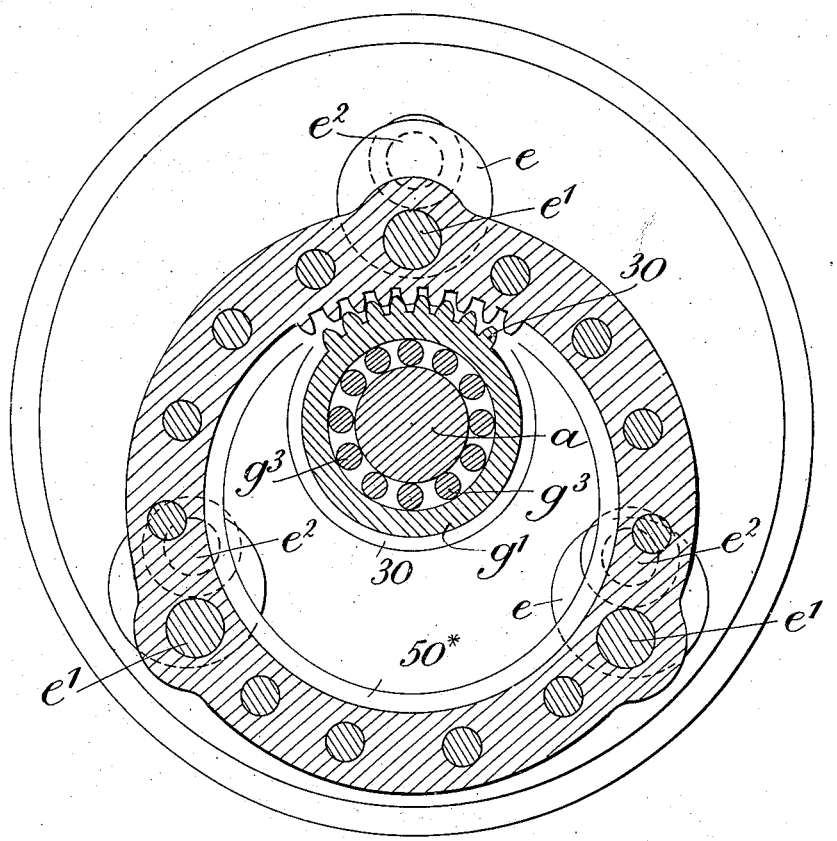

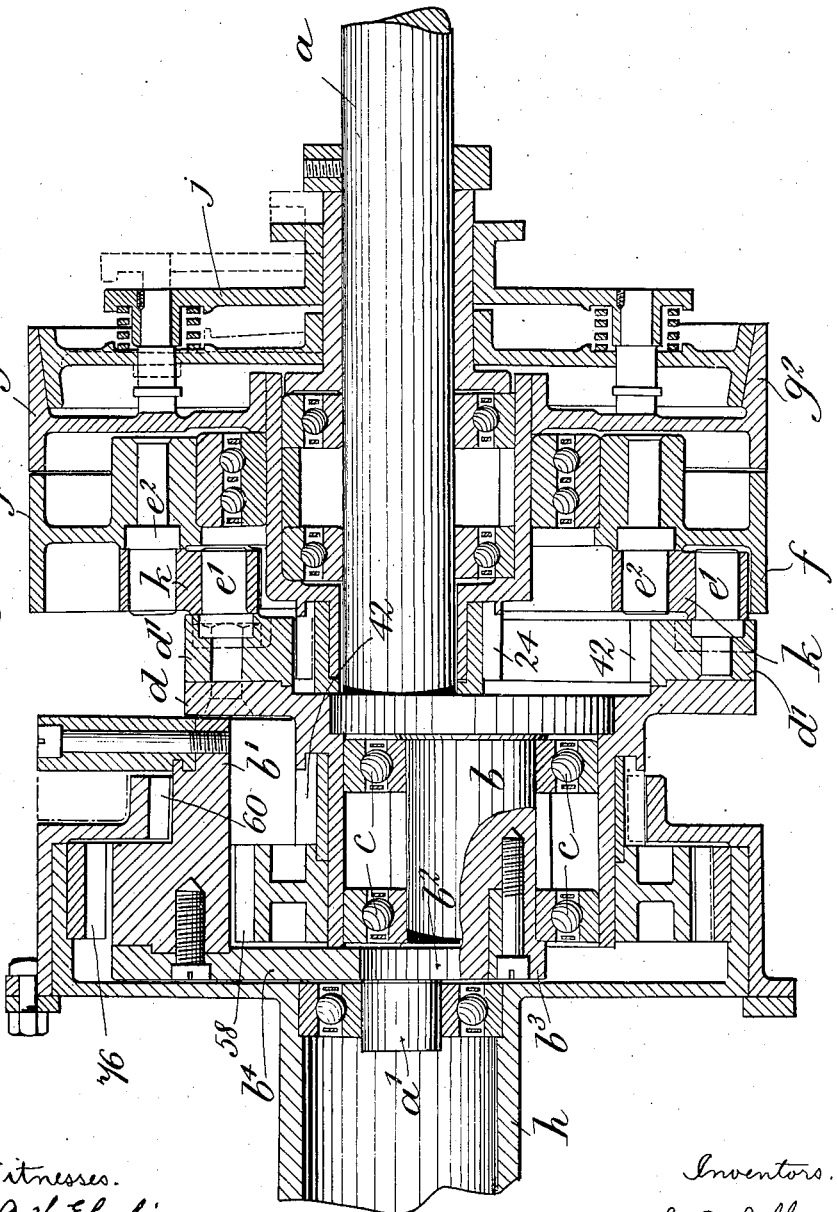

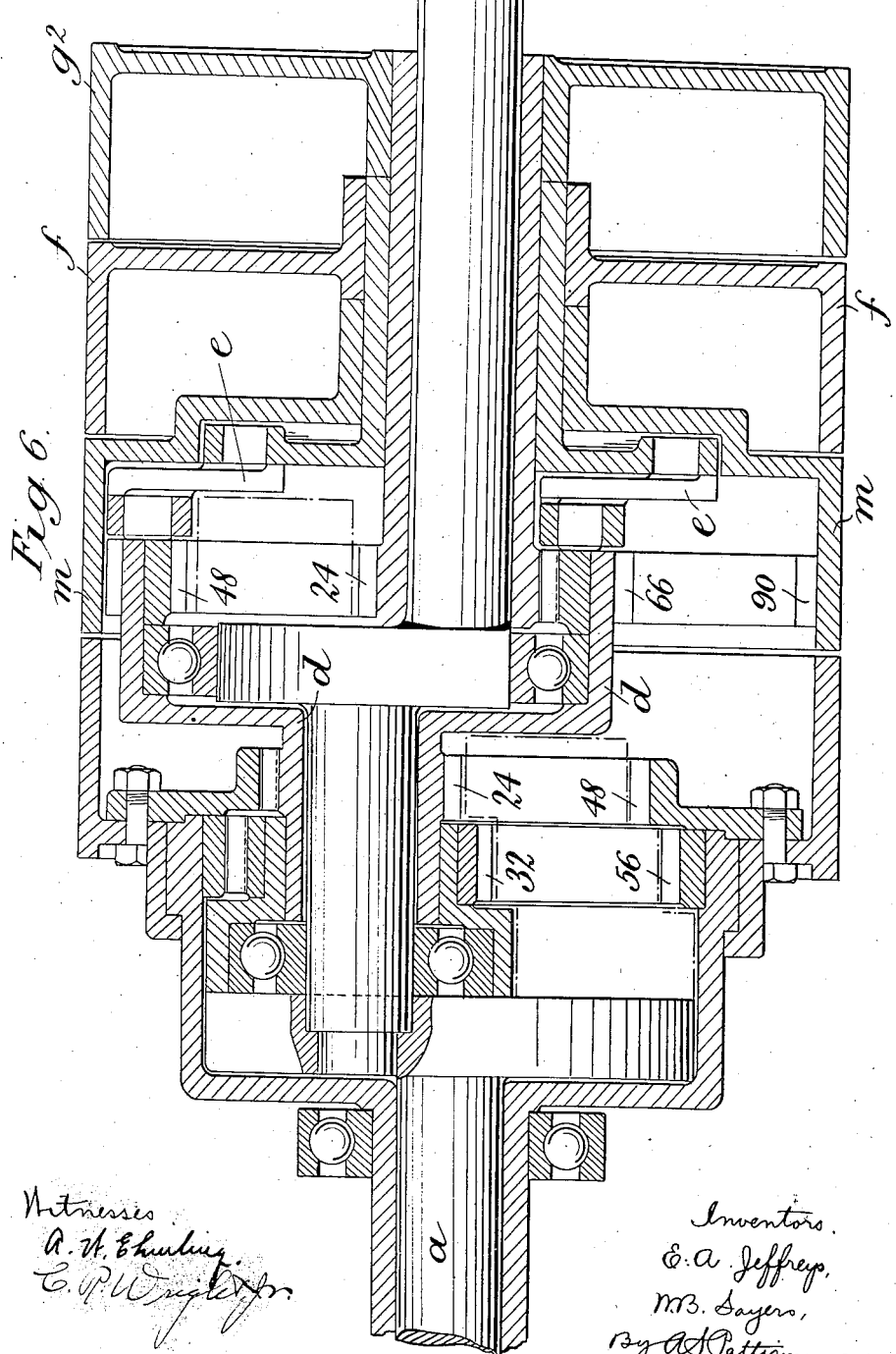

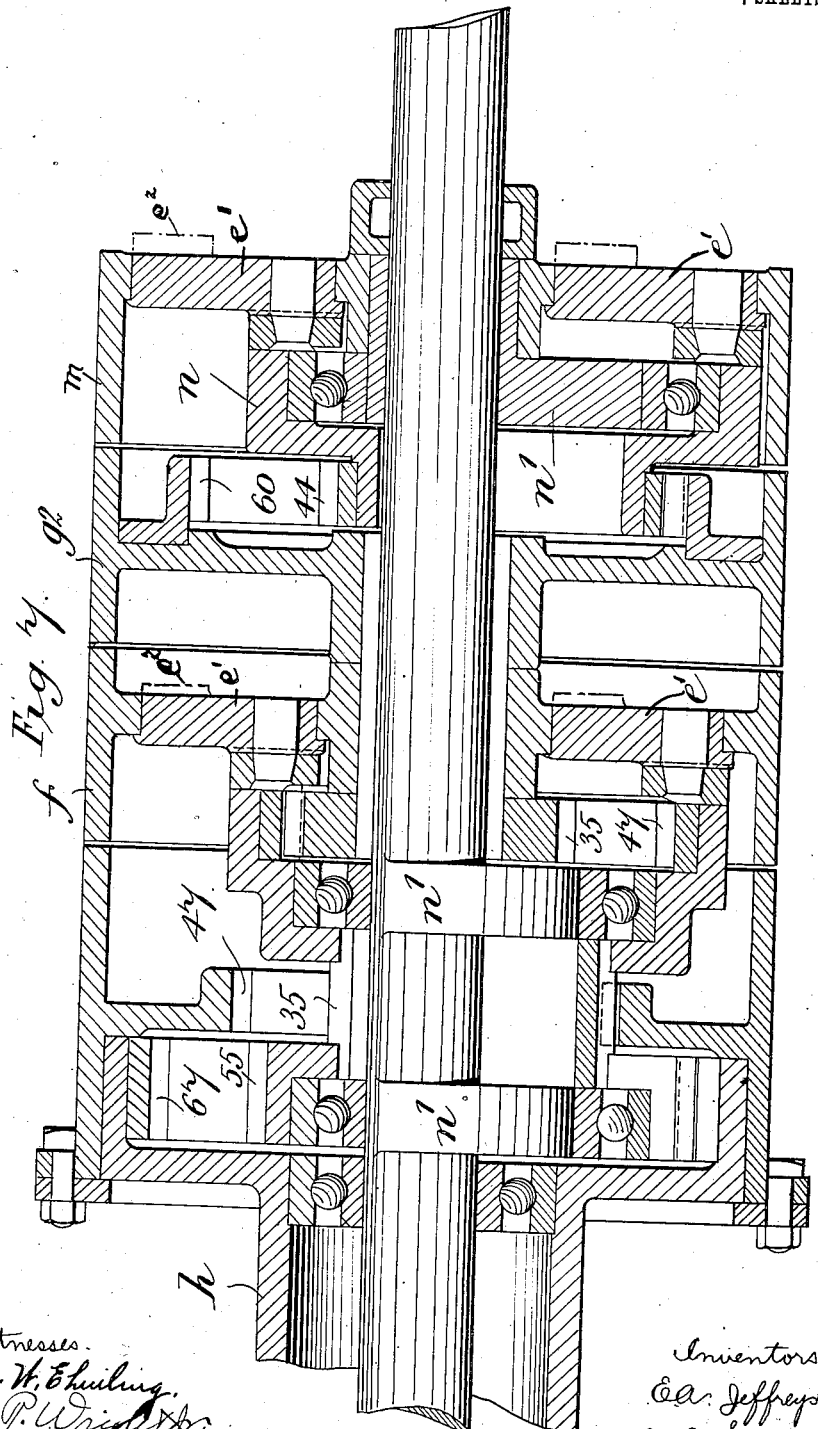

UNITED STATES PATENT OFFICE.

EDWARD AUGUSTUS JEFFREYS AND WILLIAM BROOKS SAYERS, OF GLASGOW, SCOTLAND.

GEARING.

No. 919,359.   Specification of Letters Patent.   Patented April 27, 1909.

Application filed March 6, 1908. Serial No. 419,489.

*To all whom it may concern:*

Be it known that we, EDWARD AUGUSTUS JEFFREYS and WILLIAM BROOKS SAYERS, subjects of the King of Great Britain and Ireland, residing, respectively, at Glasgow, in the county of Lanark, Scotland, have invented Improved Gearing, of which the following is a specification.

This invention relates to epicyclic driving mechanism of a general type now well known in various forms, embodying an externally toothed member driven eccentrically by the prime mover in relation to an internally toothed member connected to or forming part of the driven body or bodies and serving in its simplest form as a speed reducing gear, and in other forms as variable speed changing and reversing gear the driving and driven bodies in either case being able to exchange functions when required.

Hitherto in mechanism of this character the eccentrically driven member has been constrained to move without rotation about its own axis in various ways, none of which however are entirely successful for various reasons. Thus a speed reduction gear has been proposed in which the desired eccentricity and constraint are derived by the employment of pins upon one member which extend within circular holes of considerably larger diameter in the other member, there being a consequent eccentric motion between such pins and the holes aforesaid as the eccentrically driven member operates. With such an arrangement however any wear or slackness which may occur or exist between the eccentrically driven member and the eccentric which effects the drive, will result in "play" between the pins and holes aforesaid and cause objectionable knocking or hammering.

Now the object of the present invention is to avoid, in mechanism operating similarly to that above referred to, the foregoing disadvantage by connecting the toothed member, which is to be driven eccentrically, to a member which may be either a non-revoluble member or a member adapted to be used either stationarily or while revolving at will, by cranks, crank links or eccentrics of such a character, as hereinafter described, that the eccentricity of motion of the toothed member with respect to the other member is unaffected by wear of, or looseness at, the driving eccentric.

Figure 1:
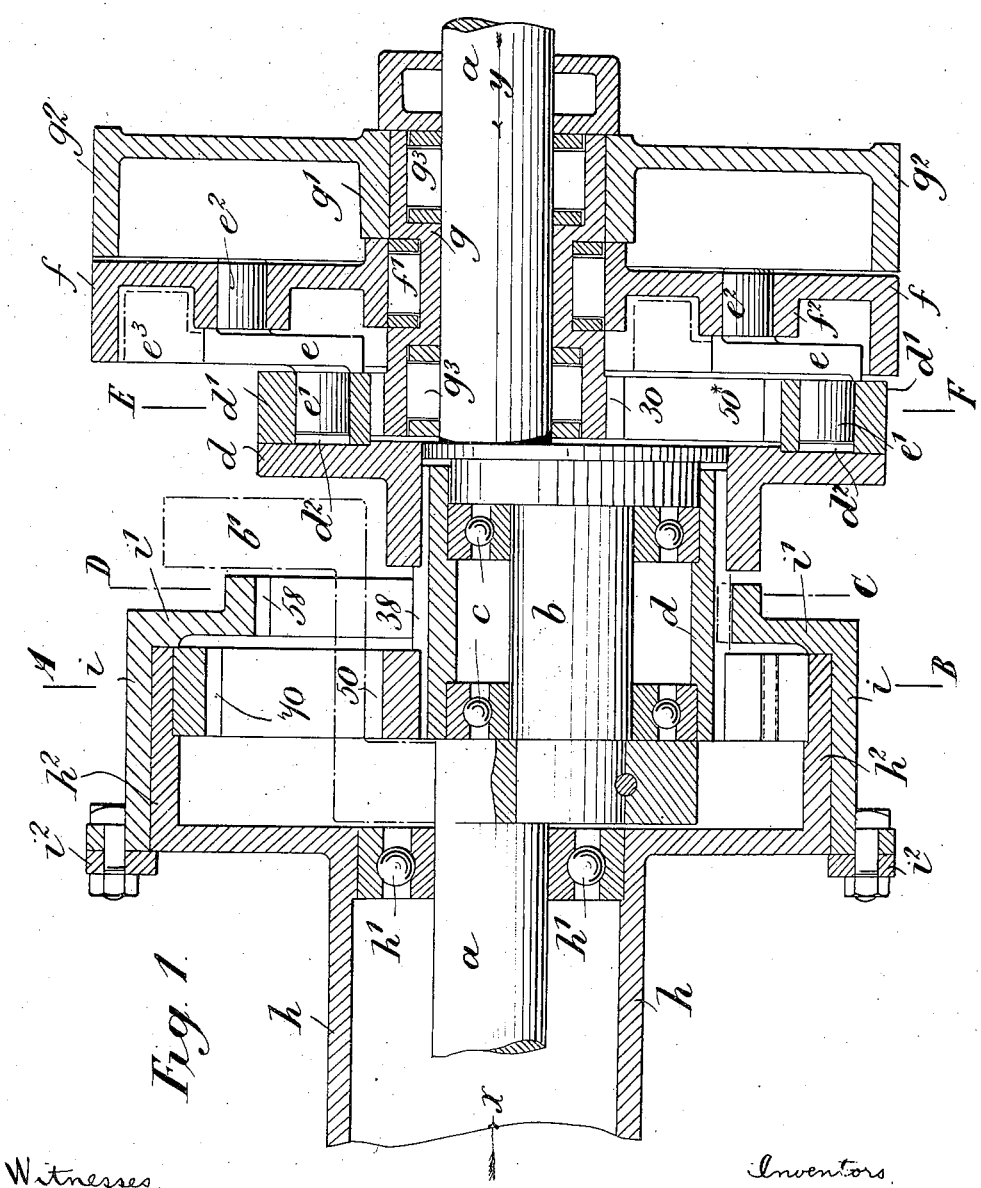
Figure 2:
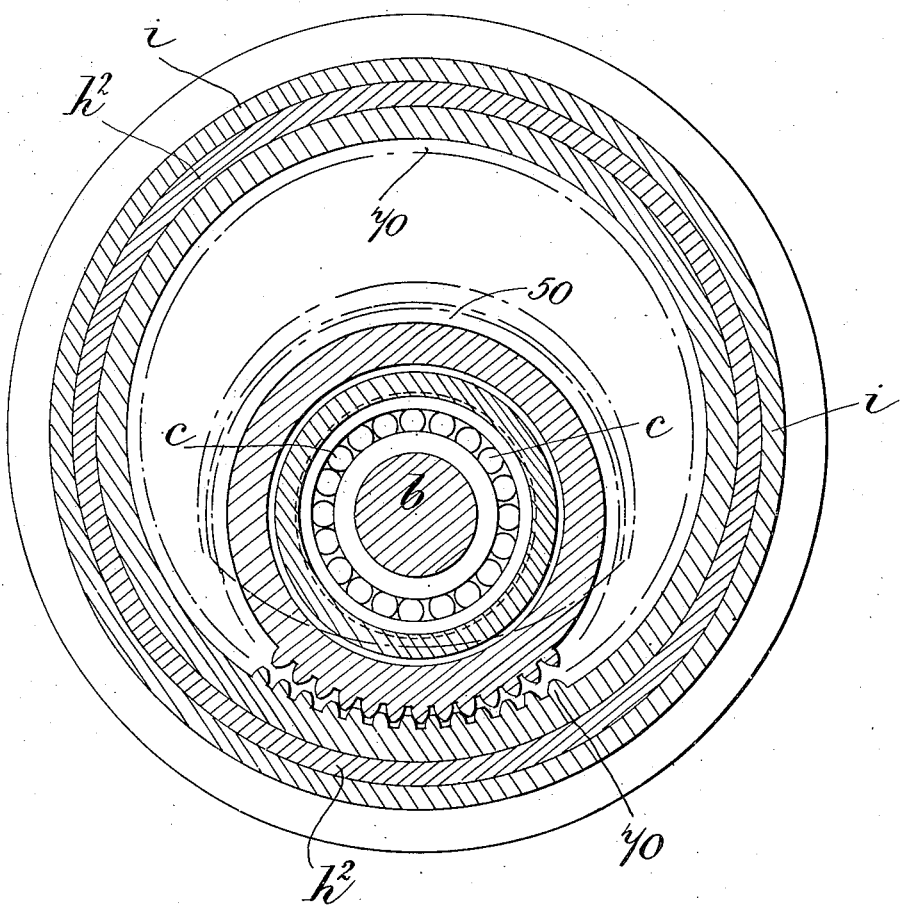
Figure 3:
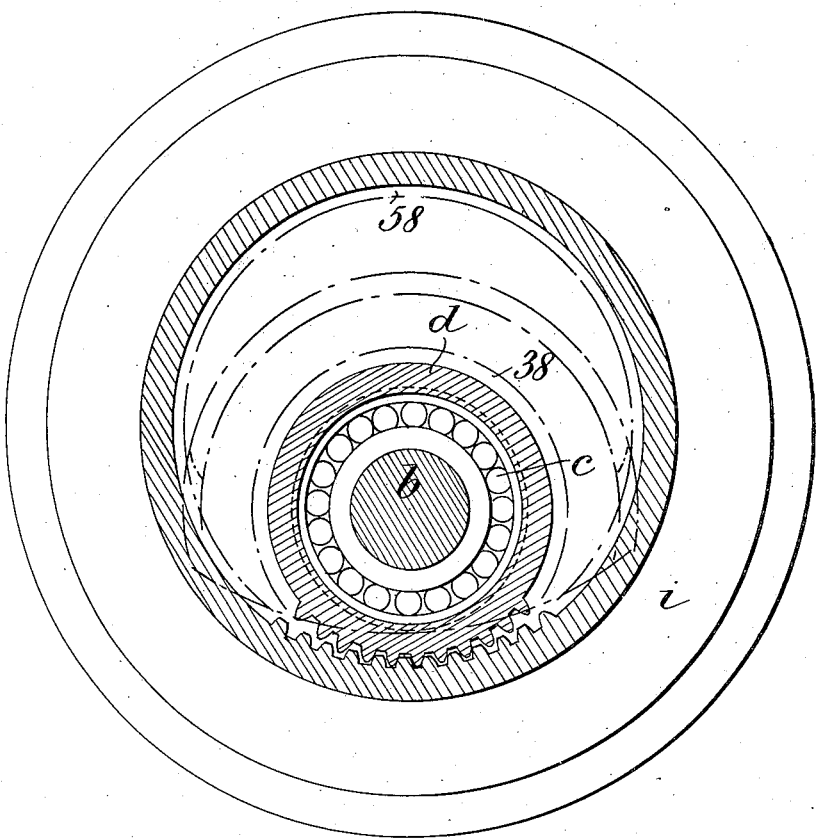

In the accompanying drawings, Figure 1 is a central longitudinal section of a gear arrangement capable of producing three forward speeds and reversal at another speed. Figs. 2, 3 and 4 are cross sections taken respectively on the lines A—B, C—D and E—F of Fig. 1, Figs. 2 and 3 being viewed in the direction of the arrow *y* and Fig. 4 in the direction of the arrow *x*. Fig. 5 is a view similar to Fig. 1 illustrating a modified construction. Figs. 6 and 7 are views likewise similar to Fig. 1 illustrating two forms of gear for obtaining four forward speeds and reversal at another speed.

In Figs. 1, 5, 6 and 7 the sections are not absolutely true but more or less conventional to illustrate the features clearly as will be obvious by comparison of the views.

Referring first to Figs. 1 to 4 of the drawings $a$ is the engine shaft which is supported in any convenient type of bearings, not shown, and formed or provided with a crank $b$ upon which is carried by ball bearings $c$ a sleeve $d$ consisting in part of the ring $d^1$. The said sleeve $d$ is connected as by cranks $e$, having a throw equal to that of the crank $b$, to a wheel $f$ which is revoluble upon the reduced portion $g$ of the hub $g^1$ of a second wheel $g^2$ itself revoluble upon the engine shaft $a$. As shown, the wheel $f$ revolves on a roller bearing $f^1$ and the wheel $g^2$ upon roller bearings $g^3$. The pins $c^1$ of the cranks $e$ which may conveniently be three in number revolve in recesses $d^2$ spaced equidistantly around the ring $d^1$, the pins $e^2$ of the cranks revolving similarly in appropriately bored bosses $f^2$ on the wheel $f$. If desired the crank $b$ and cranks $e$ or either of them can be counterweighted as indicated in dot and dash lines at $b^1$ and $e^3$ Fig. 1. $h$ is the power sleeve or shaft, which in addition to being carried in any appropriate bearing or bearings, not shown, may be supported as by a ball bearing $h^1$ upon the engine shaft $a$, or serve as a support for such shaft. $h^2$ is a wheel ring or flange upon the sleeve or shaft $h$, upon which is revolubly mounted an annular member or wheel $i$, being retained in position thereon by the flange portion $i^1$ and the cover ring $i^2$. It is to be understood that brake straps, bands or any other suitable device or means will be employed in conjunction with the revoluble members $f$, $g^2$ and $i$ for the purpose of arresting any of the same at will as is usual in many similar gears but which being therefore well known are not here illustrated. Further for the sake of simplicity in understanding the description relating to the speeds derivable by the gear, as hereafter set forth, the gear wheels now to be referred to will be designated by numerals corresponding to the number of teeth of the several wheels, without intention however of being limited in any way to such numbers.

The sleeve $d$, according to the example, is provided with an external ring of teeth 50 engaging an internal ring of teeth 70 upon the wheel rim $h^2$, an external ring of teeth 38 engaging an internal ring of teeth 58 upon the wheel $i$, and, on the ring $d^1$, an internal ring of teeth 50 engaging an external ring of teeth 30 upon the hub $g^1$ of the wheel $g^2$.

The action is as follows:—Assuming the wheel $f$ to be stationary then the sleeve $d$, $d^1$ on being moved by the crank $b$ will be constrained by the cranks $e$ to travel without rotation about its own axis, in a path concentric with the engine shaft. Hence the power sleeve or shaft $h$ is rotated by the engaged toothed rings 50, 70, at each revolution of the engine shaft, by an amount equal to the difference between the numbers of teeth aforesaid viz. 20 so that if the speed of the engine shaft be 800 revolutions per minute the power sleeve or shaft $h$ will be driven 230 revolutions per minute roughly. Under these conditions the wheel rim $i$ revolved by engaged toothed rings 38, 58 overruns the wheel rim $h^2$ and the wheel $g^2$ is rotated in a backward direction by the engaged toothed rings 50, 30. If now the wheel $f$ be liberated and the wheel $g^2$ be held stationary in lieu thereof, the sleeve $d$ will be caused to revolve about its own axis in addition to traveling in the path of the engine shaft crank $b$ but at a speed less than that of the engine shaft determined by the toothed rings 50, 30 that is to say equal to the difference in number of their teeth so that the revolutions per minute compared with the speed of the engine shaft $a$ will be 320 revolutions per minute which modified in the ratio of $\frac{4.0}{7.0}$ is reduced to 230 and added to the speed of the sleeve $d$ around the crank centers imparts a resultant speed of 550 revolutions approximately per minute to the power sleeve or shaft $h$.

For backward rotation the wheel rim $i$ is held stationary and the wheels $f$ and $g^2$ are liberated, in which case the sleeve $d$ will be revolved negatively about its own axis at a speed of 420 approximately but this speed is reduced by the toothed rings 50 and 70 to 300 approximately from which however has to be deducted the speed, viz., about 230, at which the toothed ring 70 would have been driven forward had the sleeve $d$ been stationary, thus causing the power sleeve $h$ to rotate backward at the speed corresponding to the difference between the two, or 70 revolutions per minute approximately.

Fig. 5 illustrates a modified construction of gearing, similar to that just described, in which the crank $b$ is formed in one with the engine shaft $a$. The portion $a^1$ of the shaft $a$ is reduced in diameter and the web $b^2$ turned to a diameter corresponding to the crank pin $b$ but eccentric thereto, preferably so that one point in the circumference coincides with a point in the circumference of the reduced shaft portion $a^1$ by which means the ball bearings $c$ can be easily placed in position, the cut away part of the web $b^2$ being occupied by a portion $b^3$ of the plate $b^4$ carrying the balance weight $b^1$. In this example the toothed rings corresponding to the rings already fully described are assumed to have teeth agreeing in number with the numerals respectively applied thereto. The through drive or highest speed of the power sleeve or shaft $h$ is derivable by clutching the wheel $g^2$, as by a member $j$, to the shaft $a$, when the teeth 24 will cause the sleeve $d$ to revolve with the shaft $a$ and consequently positively rotate the sleeve or shaft $h$ without slip. The cranks $e$ of Fig. 1 have been replaced by links $k$ or knuckles revoluble on stationary pins $e^1$ $e^2$ secured respectively to the ring $d^1$ and wheel $f$.

Fig. 6 shows a form of gearing for enabling four forward speeds to be obtained as well as a single backward speed. According to it the sleeve $d$ is provided with an additional ring of external teeth referred to as 66 engaging an internal ring of teeth 90 in a supplementary wheel $m$. As in the first described case, retention of the wheel $f$ will produce a certain reduced speed of the sleeve or shaft $h$ as compared with that of the engine shaft $a$, while liberation of such wheel and retention of the wheel $g^2$ will produce a speed which more nearly approaches that of the shaft $a$. If the wheel $m$ be held stationary and the wheels $f$ and $g^2$ be both free to revolve a speed less than either of the speeds referred to can be secured and may be utilized as the first speed, that is to say the sleeve $d$ will be rotated negatively about its own axis by the engaged toothed rings 66, 90 and in this way diminish, by approximately one half, the speed of the sleeve or shaft $h$ which would have resulted from the toothed rings 32, 56 had the sleeve $d$ been prevented from revolving by means of the cranks $e$ as is insured by holding the wheel $f$ stationary. The action of the gearing in other respects is the same as described with regard to Fig. 1, the difference residing in the altered gear ratios as is indicated.

Fig. 7 illustrates another modification in which the supplemental wheel $m$ when held stationary is arranged to produce a speed between that obtainable by holding the wheel $g^2$ stationary and full speed. In this case the supplemental wheel $m$ controls a supplemental eccentrically driven sleeve $n$ fitted with an external ring of teeth 44 engaging an internal ring of teeth 60 carried by the wheel $g^2$. This sleeve $n$ is constrained in its movement by eccentrics $e^1$ (as is also the sleeve $d$) connected with the wheel $m$ and, like the sleeve $d$, is operated by an eccentric $n_1$ instead of by a crank. As will be appreciated the speeds derived by holding the wheels $f$ and $g^2$ will be similar to those previously described except in so far as the gear ratios indicated differ therefrom. When the wheel $m$ is held, however, the sleeve $n$ will, without revolving about its own axis, rotate the wheel $g^2$ through the toothed rings 44, 60 which in turn will cause the wheel $f$ and sleeve $h$ to be rotated at a speed greater than that imparted to the same while the wheel $g^2$ was stationary and thus further increase the speed. In like manner the range and number of speeds obtainable can be increased by employing a greater number of eccentrically driven sleeves or members, of the special character referred to with appropriate revoluble wheels and toothed rings, the speed derived in some cases being even greater than that of the through drive. The balancing of the eccentrics $e^1$ can be readily effected by thickening the metal at $e^2$ as indicated in dot and dash lines.

Although the wheel $f$ carrying the cranks, crank links $e$ or eccentrics $e^1$ are shown in Figs. 6 and 7 with plain cylindrical bearings it will be understood that the same may be arranged to run on roller bearings as in Fig. 1 or on ball bearings as shown in Fig. 5.

The improved gearing is of a very compact construction and convenient in form.

What we claim is:—

1. Epicyclic driving mechanism comprising a shaft an internally toothed wheel carried thereby, an internally toothed wheel revoluble upon the exterior of the first internally toothed wheel and adapted to be held stationary at will, an externally toothed sleeve engaging both of said wheels, means for eccentrically driving said sleeve, a wheel adapted to be held stationary or to revolve at will and means connecting the externally toothed sleeve to the last named wheel so that when the latter is stationary, the sleeve is positively constrained to its correct eccentric path independently of its driving means.

2. Epicyclic driving mechanism comprising a shaft an internally toothed wheel carried thereby, an internally toothed wheel revoluble upon the exterior of the first internally toothed wheel and adapted to be held stationary at will, an externally toothed sleeve engaging both of said wheels, means for eccentrically driving said sleeve, a wheel adapted to be held stationary or to revolve at will and counterbalanced means connecting the externally toothed sleeve to the last named wheel so that when the latter is stationary, the sleeve is positively constrained to its correct eccentric path independently of its driving means.

3. Epicyclic driving mechanism comprising a shaft an internally toothed wheel carried thereby, an internally toothed wheel revoluble upon the exterior of the first internally toothed wheel and adapted to be held stationary at will, an externally toothed sleeve engaging both of said wheels, means for eccentrically driving said sleeve, a wheel adapted to be held stationary or to revolve at will and eccentrics connecting the externally toothed sleeve to the last named wheel so that when the latter is stationary, the sleeve is positively constrained to its correct eccentric path independently of its driving means.

4. Epicyclic driving mechanism comprising a shaft an internally toothed wheel carried thereby, an internally toothed wheel revoluble upon the exterior of the first internally toothed wheel and adapted to be held stationary at will, an externally toothed sleeve engaging both of said wheels, means for eccentrically driving said sleeve, a wheel adapted to be held stationary or to revolve at will and counterbalanced eccentrics connecting the externally toothed sleeve to the last named wheel so that when the latter is stationary, the sleeve is positively constrained to its correct eccentric path independently of its driving means.

5. Epicyclic driving mechanism, comprising a shaft an internally toothed wheel carried thereby, an externally and internally toothed sleeve exteriorly engaging the said wheel, a motor shaft having means for eccentrically driving said sleeve, a wheel adapted to be held stationary or to revolve at will upon the motor shaft and having an external ring of teeth engaging the toothed interior of the eccentrically driven sleeve, a wheel adapted to be held stationary or to revolve alternatively with the last named wheel and mounted on the hub of said wheel, and means connecting the toothed sleeve to the last named wheel so that when the latter is stationary the sleeve is positively constrained to its correct eccentric path independently of its driving means on the motor shaft.

6. Epicyclic driving mechanism, comprising a shaft an internally toothed wheel carried thereby, an externally and internally toothed sleeve exteriorly engaging the said wheel, a motor shaft having means for eccentrically driving said sleeve, a wheel adapted to be held stationary or to revolve at will upon the motor shaft and having an external ring of teeth engaging the toothed interior of the eccentrically driven sleeve, a wheel adapted to be held stationary or to revolve alternatively with the last named wheel and mounted on the hub of said wheel, and counterbalanced means connecting the toothed sleeve to the last named wheel so that when the latter is stationary the sleeve is positively constrained to its correct eccentric path independently of its driving means on the motor shaft.

7. Epicyclic driving mechanism, comprising a shaft an internally toothed wheel carried thereby, an externally and internally toothed sleeve exteriorly engaging the said wheel, a motor shaft having means for eccentrically driving said sleeve, a wheel adapted to be held stationary or to revolve at will upon the motor shaft and having an external ring of teeth engaging the toothed interior of the eccentrically driven sleeve, a wheel adapted to be held stationary or to revolve alternatively with the last named wheel and mounted on the hub of said wheel, and eccentrics connecting the toothed sleeve to the last named wheel so that when the latter is stationary the sleeve is positively constrained to its correct eccentric path independently of its driving means on the motor shaft.

8. Epicyclic driving mechanism, comprising a shaft an internally toothed wheel carried thereby, an externally and internally toothed sleeve exteriorly engaging the said wheel, a motor shaft having means for eccentrically driving said sleeve, a wheel adapted to be held stationary or to revolve at will upon the motor shaft and having an external ring of teeth engaging the toothed interior of the eccentrically driven sleeve, a wheel adapted to be held stationary or to revolve alternatively with the last named wheel and mounted on the hub of said wheel, and counterbalanced eccentrics connecting the toothed sleeve to the last named wheel so that when the latter is stationary the sleeve is positively constrained to its correct eccentric path independently of its driving means on the motor shaft.

9. Epicyclic driving mechanism, comprising a shaft an internally toothed wheel carried thereby, an internally toothed wheel revoluble upon the exterior of the first internally toothed wheel and adapted to be held stationary at will, an externally and internally toothed sleeve exteriorly engaging the said wheels, a motor shaft having means for eccentrically driving said sleeve, a wheel adapted to be held stationary or to revolve at will upon the motor shaft and having an external ring of teeth engaging the toothed interior of the eccentrically driven sleeve, a wheel adapted to be held stationary or to revolve alternatively with the last named wheel and mounted on the hub of said wheel, and means connecting the toothed sleeve to the last named wheel so that when the latter is stationary the sleeve is positively constrained to its correct eccentric path independently of its driving means on the motor shaft.

10. Epicyclic driving mechanism, comprising a shaft an internally toothed wheel carried thereby, an internally toothed wheel revoluble upon the exterior of the first internally toothed wheel and adapted to be held stationary at will, an externally and internally toothed sleeve exteriorly engaging the said wheels, a motor shaft having means for eccentrically driving said sleeve, a wheel adapted to be held stationary or to revolve at will upon the motor shaft and having an external ring of teeth engaging the toothed interior of the eccentrically driven sleeve, a wheel adapted to be held stationary or to revolve alternatively with the last named wheel and mounted on the hub of said wheel, and counterbalanced means connecting the toothed sleeve to the last named wheel so that when the latter is stationary the sleeve is positively constrained to its correct eccentric path independently of its driving means on the motor shaft.

11. Epicyclic driving mechanism, comprising a shaft an internally toothed wheel carried thereby, an internally toothed wheel revoluble upon the exterior of the first internally toothed wheel and adapted to be held stationary at will, an externally and internally toothed sleeve exteriorly engaging the said wheels, a motor shaft having means for eccentrically driving said sleeve, a wheel adapted to be held stationary or to revolve at will upon the motor shaft and having an external ring of teeth engaging the toothed interior of the eccentrically driven sleeve, a wheel adapted to be held stationary or to revolve alternatively with the last named wheel and mounted on the hub of said wheel, and eccentrics connecting the toothed sleeve to the last named wheel so that when the latter is stationary the sleeve is positively constrained to its correct eccentric path independently of its driving means on the motor shaft.

12. Epicyclic driving mechanism, comprising a shaft an internally toothed wheel carried thereby, an internally toothed wheel revoluble upon the exterior of the first internally toothed wheel and adapted to be held stationary at will, an externally and internally toothed sleeve exteriorly engaging the said wheels, a motor shaft having means for eccentrically driving said sleeve, a wheel adapted to be held stationary or to revolve at will upon the motor shaft and having an external ring of teeth engaging the toothed interior of the eccentrically driven sleeve, a wheel adapted to be held stationary or to revolve alternatively with the last named wheel and mounted on the hub of said wheel, and counterbalanced eccentrics connecting the toothed sleeve to the last named wheel so that when the latter is stationary the sleeve is positively constrained to its correct eccentric path independently of its driving means on the motor shaft.

13. Epicyclic driving mechanism, comprising a shaft an internally toothed wheel carried thereby, an externally and internally toothed sleeve exteriorly engaging the said wheel, a motor shaft having means for eccentrically driving said sleeve, a wheel adapted to be held stationary or to revolve at will upon the motor shaft and having an external ring of teeth engaging the toothed interior of the eccentrically driven sleeve and an independent ring of internal teeth, a wheel adapted to be held stationary or to revolve alternatively with the last named wheel and mounted on the hub of said wheel, a toothed sleeve exteriorly engaging the independent ring of teeth of the second named wheel, a wheel adapted to be held stationary or to revolve at will upon the motor shaft located adjacent to the said toothed sleeve, and means connecting the first-named toothed sleeve to the second named wheel and the last named toothed sleeve to the last named wheel so that when either of said wheels is held stationary the corresponding sleeve is positively constrained to its correct eccentric path independently of its driving means on the motor shaft.

14. Epicyclic driving mechanism, comprising a shaft an internally toothed wheel carried thereby, an externally and internally toothed sleeve exteriorly engaging the said wheel, a motor shaft having means for eccentrically driving said sleeve, a wheel adapted to be held stationary or to revolve at will upon the motor shaft and having an external ring of teeth engaging the toothed interior of the eccentrically driven sleeve and an independent ring of internal teeth, a wheel adapted to be held stationary or to revolve alternatively with the last named wheel and mounted on the hub of said wheel, a toothed sleeve exteriorly engaging the independent ring of teeth of the second named wheel, a wheel adapted to be held stationary or to revolve at will upon the motor shaft located adjacent to the said toothed sleeve, and counterbalanced means connecting the first named toothed sleeve to the second named wheel and the last named toothed sleeve to the last named wheel so that when either of said wheels is held stationary the corresponding sleeve is positively constrained to its correct eccentric path independently of its driving means on the motor shaft.

15. Epicyclic driving mechanism, comprising a shaft an internally toothed wheel carried thereby, an externally and internally toothed sleeve exteriorly engaging the said wheel, a motor shaft having means for eccentrically driving said sleeve, a wheel adapted to be held stationary or to revolve at will upon the motor shaft and having an external ring of teeth engaging the toothed interior of the eccentrically driven sleeve and an independent ring of internal teeth, a wheel adapted to be held stationary or to revolve alternatively with the last named wheel and mounted on the hub of said wheel, a toothed sleeve exteriorly engaging the independent ring of teeth of the second named wheel, a wheel adapted to be held stationary or to revolve at will upon the motor shaft located adjacent to the said toothed sleeve, and eccentrics connecting the first named toothed sleeve to the second named wheel and the last named toothed sleeve to the last named wheel so that when either of said wheels is held stationary the corresponding sleeve is positively constrained to its correct eccentric path independently of its driving means on the motor shaft.

16. Epicyclic driving mechanism, comprising a shaft an internally toothed wheel carried thereby, an externally and internally toothed sleeve exteriorly engaging the said wheel, a motor shaft having means for eccentrically driving said sleeve, a wheel adapted to be held stationary or to revolve at will upon the motor shaft and having an external ring of teeth engaging the toothed interior of the eccentrically driven sleeve and an independent ring of internal teeth, a wheel adapted to be held stationary or to revolve alternatively with the last named wheel and mounted on the hub of said wheel, a toothed sleeve exteriorly engaging the independent ring of teeth of the second named wheel, a wheel adapted to be held stationary or to revolve at will upon the motor shaft located adjacent to the said toothed sleeve, and counterbalanced eccentrics connecting the first named toothed sleeve to the second named wheel and the last named toothed sleeve to the last named wheel so that when either of said wheels is held stationary the corresponding sleeve is positively constrained to its correct eccentric path independently of its driving means on the motor shaft.

17. Epicyclic driving mechanism, comprising a shaft an internally toothed wheel carried thereby, an internally toothed wheel revoluble upon the exterior of the first internally toothed wheel and adapted to be held stationary at will, an externally and internally toothed sleeve exteriorly engaging the said wheels, a motor shaft having means for eccentrically driving said sleeve, a wheel adapted to be held stationary or to revolve at will upon the motor shaft and having an external ring of teeth engaging the toothed interior of the eccentrically driven sleeve and an independent ring of internal teeth, a wheel adapted to be held stationary or to revolve alternatively with the last named wheel and mounted on the hub of said wheel, a toothed sleeve exteriorly engaging the independent ring of teeth of the second named wheel, a wheel adapted to be held stationary or to revolve at will upon the motor shaft located adjacent to the said toothed sleeve, and means connecting the first named toothed sleeve to the second named wheel and the last named toothed sleeve to the last named wheel so that when either of said wheels is held stationary the corresponding sleeve is positively constrained to its correct eccentric path independently of its driving means on the motor shaft.

18. Epicyclic driving mechanism, comprising a shaft an internally toothed wheel carried thereby, an internally toothed wheel revoluble upon the exterior of the first internally toothed wheel and adapted to be held stationary at will, an externally and internally toothed sleeve exteriorly engaging the said wheels, a motor shaft having means for eccentrically driving said sleeve, a wheel adapted to be held stationary or to revolve at will upon the motor shaft and having an external ring of teeth engaging the toothed interior of the eccentrically driven sleeve and an independent ring of internal teeth, a wheel adapted to be held stationary or to revolve alternatively with the last named wheel and mounted on the hub of said wheel, a toothed sleeve exteriorly engaging the independent ring of teeth of the second named wheel, a wheel adapted to be held stationary or to revolve at will upon the motor shaft located adjacent to the said toothed sleeve, and counterbalanced means connecting the first named toothed sleeve to the second named wheel and the last named toothed sleeve to the last named wheel so that when either of said wheels is held stationary the corresponding sleeve is positively constrained to its correct eccentric path independently of its driving means on the motor shaft.

19. Epicyclic driving mechanism, comprising a shaft an internally toothed wheel carried thereby, an internally toothed wheel revoluble upon the exterior of the first internally toothed wheel and adapted to be held stationary at will, an externally and internally toothed sleeve exteriorly engaging the said wheels, a motor shaft having means for eccentrically driving said sleeve, a wheel adapted to be held stationary or to revolve at will upon the motor shaft and having an external ring of teeth engaging the toothed interior of the eccentrically driven sleeve and an independent ring of internal teeth, a wheel adapted to be held stationary or to revolve alternatively with the last named wheel and mounted on the hub of said wheel, a toothed sleeve exteriorly engaging the independent ring of teeth of the second named wheel, a wheel adapted to be held stationary or to revolve at will upon the motor shaft located adjacent to the said toothed sleeve, and eccentrics connecting the first named toothed sleeve to the second named wheel and the last named toothed sleeve to the last named wheel so that when either of said wheels is held stationary the corresponding sleeve is positively constrained to its correct eccentric path independently of its driving means on the motor shaft.

20. Epicyclic driving mechanism, comprising a shaft an internally toothed wheel carried thereby, an internally toothed wheel revoluble upon the exterior of the first internally toothed wheel and adapted to be held stationary at will, an externally and internally toothed sleeve exteriorly engaging the said wheels, a motor shaft having means for eccentrically driving said sleeve, a wheel adapted to be held stationary or to revolve at will upon the motor shaft and having an external ring of teeth engaging the toothed interior of the eccentrically driven sleeve an independent ring of internal teeth, a wheel adapted to be held stationary or to revolve alternatively with the last named wheel and mounted on the hub of said wheel, a toothed sleeve exteriorly engaging the independent ring of teeth of the second named wheel, a wheel adapted to be held stationary or to revolve at will upon the motor shaft located adjacent to the said toothed sleeve, and counterbalanced eccentrics connecting the first named toothed sleeve to the second named wheel and the last named toothed sleeve to the last named wheel so that when either of said wheels is held stationary the corresponding sleeve is positively constrained to its correct eccentric path independently of its driving means on the motor shaft.

Signed at Glasgow Scotland this twenty-fifth day of February 1908.

EDWARD AUGUSTUS JEFFREYS.
WILLIAM BROOKS SAYERS.

Witnesses:
ALFRED MIDDLETON,
ROBERT A. THOMSON.